United States Patent Office 3,361,779
Patented Jan. 2, 1968

3,361,779
ORGANOMETALLIC COMPOUNDS
Thomas H. Coffield, Heidelberg, Germany, and Rex D. Closson, Northville, Mich., assignors to Ethyl Corporation, New York, N.Y., a corporation of Virginia
No Drawing. Filed Aug. 20, 1959, Ser. No. 834,931
18 Claims. (Cl. 260—429)

This application is a continuation-in-part of my earlier filed copending application, U.S. Ser. No. 690,909, filed on Oct. 18, 1957, now abandoned.

This invention relates to novel organometallic compounds and their preparation. More particularly the present invention relates to novel and useful aromatic transition metal complexes.

An object of this invention is to provide a novel class of organometallic compounds. Another object is to provide a novel class of stable aromatic transition metal coordination compounds. A further object is to prove a novel class of stable non-ionic aromatic metal complexes having unsymmetric configurations. A still further object is to provide a class of stable non-ionic aromatic transition metal complexes in which a single aromatic molecule is coordinated with a metal atom. Other objects will become apparent from the following discussions.

The above objects are accomplished by a non-ionic complex aromatic metal compound of the metals of Groups IV–B through VI–B having a single aromatic molecule bonded to the metal through the carbon atoms of the benzene ring, which compound is stabilized by additional covalent bonding to dissimilar electron-donating groups. The metal in the novel compounds of this invention is a metal of Groups IV–B, V–B and VI–B of the Periodic Table as shown in the Handbook of Chemistry and Physics (37th edition; the Chemical Rubber Publishing Co., Cleveland, Ohio, 1955) on pages 392 and 393, and thus includes those metallic elements having atomic numbers of from 22 through 24, 40 through 42 and 72 through 74.

The compounds of this invention may be represented by the formula

AMQ wherein A represents an aromatic compound having a benzene nucleus coordinted to the metal atom, M, through the carbon atoms of the benzene ring and Q represents discrete combinations of non-aromatic electron donor groups involved in covalent or coordinate-covalent bonding with the metal atom.

These novel compounds achieve stabilization through coordination of sufficient electrons to give the metal atom the electronic configuration similar to that of the next higher rare gas. The compounds of this invention can also be represented by the formula AM(B)$_b$(C)$_c$ wherein A and M are defined above and B and C represent electron-donating entities capable of donating form 1 to 8 electrons to the metal atom, $b$ is an integer ranging from 1–8, and $c$ is an integer ranging from 0–4, such that the atomic number of the metal M, plus $b$ times the number of electrons donated by $b$, plus $c$ times the number of electrons donated by C plus the six electrons donated by the aromatic molecule A equals an integer having a value of from two less than the atomic number of the next higher rare gas to the value of the next higher rare gas.

The compounds of this invention are quite different from any compound heretofore known. The aromatic portion of the compound is actually a molecule, as distinguished from an aryl radical, e.g., phenyl, which is found in organometallic compounds. The aromatic molecule is not bonded to the metal through a single carbon atom, as in the usual aryl metal compounds but, instead, each carbon of the aromatic ring is bonded apparently by coordinate covalence in a fashion such that the ring contributes six electrons to the metal atom. Likewise, the other electron donor groups also are covalently or co-ordinatively bonded to the metal atom. Such donation of electrons contributes materially to the stability of the molecule since the metal atoms, with the donated electrons, approaches the electron configuration of the next higher rare gas. In a preferred embodiment of this invention the compound has the electron configuration of the next higher rare gas. For example, the chromium atom in benzene chromium tricarbonyl has the electron configuration of krypton. Thus, in the case of benzene chromium tricarbonyl, the three CO groups donate a total of six electrons and the benzene molecule donates six electrons, giving a stable compound which can be illustrated as follows:

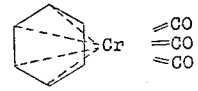

The novel aromatic metal compounds of this invention find a number of uses. In particular, the compounds are valuable as polymerization catalysts in the polymerization of unsaturated hydrocarbons wherein they have the advantage of supplying the aromatic molecule which is sometimes necessary to promote polymerization and in addition are soluble both in the hydrocarbon itself, the solvent medium, and the resulting polymers. Further, the compounds of this invention are useful as dryers in organic drying oil compositions and as metal sources in gas-phase plating.

The aromatic compounds coordinated to the metal in the compounds of this invention, which are represented by A in the above formula, are, in general, compounds containing an isolated benzene nucleus. That is, aromatic compounds which are free of aliphatic unsaturation on a carbon atom adjacent the benzene ring and which do not contain unsaturation on a carbon atom of a fused ring which carbon atom is adjacent the benzene nucleus. The aromatic compounds applicable to the compounds of this invention have no aliphatic double bond in conjugated relationship to the ring. Thus, aryl and alkyl substituted aromatic compounds are applicable to this invention, as are fused ring compounds having isolated benzene nuclei, that is, having no unsaturation on a carbon atom adjacent to the benzene ring. Aromatic compounds having from 6 to 18 carbon atoms are generally preferred in compounds of this invention. Benzene itself, mesitylene, toluene, biphenyl, Tetralin, m-hexyl-biphenyl and the like are examples of applicable aromatic compounds.

In some cases, other aromatic compounds which do not have an isolated nucleus are desirable. Typical examples of such compounds are styrene cyclopentadienyl chloro chromium, methyl-styrene cyano vanadium tricarbonyl, naphthalene dichloro titanium dinitrosyl, anthracene diethylmolybdenum dimethylene diamine, 1-ethyl naphthalene amyl vanadium tricarbonyl, and the like.

The metal constituent in the compounds of the present invention are transition metal elements of the fourth, fifth and sixth periods of the Periodic Table. These elements constitute Groups IV–B, V–B and VI–B of the Periodic Table and include, in group IV–B, titanium, zirconium and hafnium; in Group V–B, vanadium, niobium, and tantalum; and in Group VI–B, chromium, molybdenum and tungsten.

The constituents represented by B and C in the above formula are electron-donating groups capable of coordinating with the metal atom in the novel compounds of this invention, and donating thereto from 1 to 8 electrons. That is, the groups represented by B and C in the above formula are capable of sharing electrons with the metal atom so that the metal achieves a more stable structure by virtue of such added electrons. A preferred embodiment of this invention comprises those compounds in which the metal has attained the electron configuration of the next higher rare gas by virtue of the coordinating groups, as it is found that these compounds have exceptional stability.

These electron-donating groups in coordination with the metal are, generally, either organic radicals or molecular species which contain labile electrons, which electrons assume more stable configuration in the molecule when associated with the metal. The electron-donating groups applicable to the compounds of this invention may also be inorganic entities which are capable of existing as ions, such as hydrogen, the cyanide group, and the various halogens.

Donors capable of sharing a single electron with a metal atom include monovalent organic radicals, the hydrogen atom, the cyanide group CN, and the halogens, fluorine, chlorine, bromine and iodine. These groups function as electron donors by sharing an electron with an electron of the metal atom in a single covalent bond. Examples of the aromatic metal coordination compounds of this invention containing such a donor group include toluene heptabutyl zirconium, mesitylene tetracyano trichloro vandium, ethylbenzene tribromo trihydro molybdenum, benzene hexaethyl chromium, isopropyl benzene heptabromo tantalum, benzene octachloro titanium and the like.

When the electron donor group bonded to the metal atom in a compound of this invention is, or contains, a monovalent organic radical, this organic radical preferably contains up to 13 carbon atoms. These preferred organic radicals include alkyl, aryl, alkaryl, aralkyl, alkenyl radicals and the like. Specific examples include radicals derived from the following hydrocarbons: methane, ethane, propane, n-octane, 4-aryloctane, 2-phenyl heptane and the like.

Entities capable of sharing two electrons with a metal atom in the aromatic metal coordination compounds of this invention include monoolefins, ammonia, primary-, secondary-, and tertiary amines, cyclic nitrogen compounds wherein the nitrogen is in the trivalent state, organo phosphine compounds, phosphine halides, arsines, stibines, bismuthines; mixed hydroorganic phosphines, stibines, arsines and bismuthines, isonitrile and the like. Examples of the aromatic metal coordination compounds of this invention which contain such donating groups include benzene zirconium tetra-(methyl isonitrile), mesitylene chlorovanadium tricarbonyl, benzene tungsten-tris-phosphorus trichloride, toluene dimethylmolybdenum diammonia, benzene niobium-tris-diphenyl amine and the like.

The nitrosyl group, NO, is an example of an entity capable of donating three electrons to a metal atom in the novel aromatic metal coordination compounds of this invention. Examples of these novel compounds which contain the nitrosyl coordination group include benzene molybdenum dinitrosyl, amyl benzene chromium carbonyl nitrosyl, isopropylbenzene dibromovanadium nitrosyl, benzene titanium dinitrosyl and the like.

In the novel aromatic coordination compounds of this invention certain groups are capable of sharing four electrons in coordinate covalent bonds with the metal atom. These four electron donor groups include organic diamines, aliphatic diolefins, cyclic diolefins particularly those having conjugated double bonds, although nonconjugated diolefins are also applicable. When the donor group is a diamine best results are obtained when the methylene chain connecting the two nitrogen atoms is no longer than three carbons in length. Typical examples of the aromatic metal coordination compounds of this invention which contain stabilizing groups donating four electrons include mesitylene titanium bis-dimethylene diamine, benzene vanadium nitrosyl butadiene, amylbenzene chromium cyclohexadiene carbonyl, toluene trimethylhafnium N,N'-diphenylmethylenediamine, toluene dicyano zirconium cyclohexadiene and the like.

A preferred cyclic diolefin donor used in forming the compounds of our invention is cyclopentadiene. Compounds in which an aromatic molecule, as defined above, and a cyclopentadiene molecule are both coordinated with a metal atom of Groups IVB–VIB, are stable and have the characteristics of volatility and fuel solubility which make them more valuable as gasoline additives than certain of the other compounds of our invention. The cyclopentadiene molecule may contain from 5 to about 13 carbon atoms and may be substituted with various groups such as alkyl, aryl, cycloalkyl, halogen nitro groups and the like. Typical of such compounds are mesitylene titanium cyclopentadiene dicarbonyl, toluene zirconium methylcyclopentadiene dicarbonyl, hexamethylbenzene niobium cyclopentadiene nitrosyl, chlorobenzene vanadium trichloromethylcyclopentadiene carbonyl hydride, xylene dichloro chromium nitrocyclopentadiene, N,N-diethylaniline molybdenum cyclopentadiene carbonyl and anisole chromium benzylcyclopentadiene triphenylphosphine.

The cyclopentadienyl radical contributes five electrons to certain of the novel aromatic metal coordination compounds of this invention. The cyclopentadienyl radical found in these novel compounds contain from 5 to about 13 carbon atoms and thus includes the substituted cyclopentadienyl hydrocarbon radicals having up to 8 carbon atoms in a side chain substituent which may be bonded to more than one ring carbon atom. Examples of such radicals include the octylcyclopentadienyl radical, the methylcyclopentadienyl radical, the idenyl radical and the like. Examples of the novel aromatic coordination compounds of this invention containing such a cyclopentadienyl radical include benzene cyclopentadienyl chromium, toluene cyclopentadienyl methyl molybdenum, mesitylene octylcyclopentadienyl niobium carbonyl, ethylbenzene methylcyclopentadienyl hafnium nitrosyl and the like.

Aliphatic trienes represent entities capable of contributing six electrons to the metal in the aromatic metal coordination compounds of this invention. For this purpose comopunds containing the three double bonds in conjugated relationship are preferred. Toluene tungsten hexatriene, benzene chloro vanadium 3-methylhexatriene and benzene titanium nitrosyl 2,2-dimethylhexatriene carbonyl are examples of aromatic metal coordination compounds stabilized by a conjugated triene electron donor group.

The novel aromatic metal coordination compounds of this invention may contain a cycloheptatrienyl radical which contributes seven electrons in coordinate covalent bonding to the metal. The cycloheptatrienyl radical may be substituted with other hydrocarbon group and may contain a total of up to 15 carbon atoms. Examples of the aromatic metal coordination compounds of this invention which contain such cycloheptatrienyl radicals include benzene cycloheptatrienyl vanadium, toluene methylcycloheptatrienyl zirconium, mesitylene ethylcycloheptatrienyl chlorotitanium, benzene octyl cycloheptatrienyl methylzirconium and the like.

Tetraenes and in particular cyclooctatetraene may be present in the aromatic metal coordination compounds of Group IVB. These tetraenes contribute 8 electrons in coordinate covalent bond with the metal. Such aromatic metal tetraene compounds are exemplified by benzene titanium cyclooctatetraene.

The novel aromatic metal coordination compounds of this invention are susceptible to preparation by several methods. One of these comprises the preparation of a diaromatic metal complex followed by subsequent replacement of an aromatic group with an electron donating entity or entities. This may be accomplished in a single step or through a plurality of steps which include the preparation of an aromatic metal coordination compound in which the aromatic-metal-ligand portion of the molecule exists as a cation followed by reduction of such ion to the neutral coordination compound of this invention. In other cases the reaction product derived from replacing an aromatic group of a diaromatic metal complex is a neutral coordination compound of this invention which is obtained without further reduction of the metal. In other instances the novel compounds of this invention are conveniently prepared by introducing an aromatic molecule in coordinate covalent bonding in a metal coordination compound such a metal carbonyl derivative. The resulting intermediate may be an ionic compound which can be converted into the neutral aromatic metal coordination compound of this invention. Another method for the preparation of the compounds of this invention consists of introducing into a metal compound an aromatic molecule by means of an appropriate reagent such as a phenyl Grignard and subsequently converting the resulting complex to the neutral aromatic coordination compound desired. These methods will become further apparent by reference to the following specific examples in which all parts and percentages are by weight unless otherwise stated.

*Example I*

To a glass reaction vessel equipped with stirring means, heating means and reflux condenser were added 35 parts of chromium hexacarbonyl, 23 parts of aluminum chloride as a catalyst and 430 parts of mesitylene, the excess as a carrier. The mixture was agitated and heated to reflux for 3 hours during which time gas evolved and was collected. The quantity of gas evolved corresponded to three equivalents of carbon monoxide. After discontinuation of heating and reflux the reaction mixture was cooled and hydrolyzed with 300 parts of cold water and the organic layer containing mesitylene chromium tricarbonyl was separated. To recover the mesitylene chromium tricarbonyl from this solution the mesitylene is evaporated and the residue carefully sublimed. The mesitylene chromium tricarbonyl is insoluble in water but soluble in organic solvents and is oxidatively and thermally stable at temperatures in excess of its melting point which is above about 110° C.

In this preparation the aluminum chloride compound is replaced by other Friedel-Crafts type catalyst. By a Friedel-Crafts catalyst is meant a salt having electrophilic characteristics. These are usually halides of metals of Groups II-A, II-B, III-A, IV-B, V-B, VI-B, VII-B and VIII of the Periodic Table. The preferred halides are halides of Groups III-A, IV-B and VIII. Illustrative examples of preferred metal halides are boron trifluoroide, boron trichloride, boron tribromide, boron triiodide, aluminum tifluoride, titanium tetrachloride, titanium tetrabromide, ferric chloride, and the like. Also, in many instances, it is desirable to employ the corresponding hydrohalide along with the metal halide e.g. a boron trichloride-hydrogen chloride catalyst system. Other examples of suitable Friedel-Crafts catalysts of generally lesser activity are zinc, gallium, indium thallium, beryllium, magnesium, zirconium, vanadium, chromium, manganese and cobalt halides.

The Friedel-Crafts reaction is preferably carried out in a liquid medium consisting primarily of the aromatic compound which is reacted with the metal compound reactant. Thus, if it is desired to make the benzene chromium tricarbonyl, the reaction is conducted in a benzene medium. The reaction can also be conducted in a halogenated benzene such as chlorobenzene or bromobenzene, in which event the chloroaromatic or bromoaromatic manganese tricarbonyl halide is formed. Other substituted aromatic compounds can be produced in like manner.

In addition to the aromatic compound, other solvents or diluents can be employed. Typical examples of such diluents are nitrobenzene; straight chain hydrocarbons such as pentane, hexane, decane, and the like. These diluents can be used in concentrations of from 0.01 to 100 parts per part of the aromatic compound.

Other Group VI-B metal compounds of this invention are toluene chromium tricarbonyl; ethylbenzene chromium dinitrosyl; toluene cyclopentadienyl cyanochromium; mesitylene methylcyclopentadienyl bromochromium; allylbenzene indenyl methylmolybdenum; p-methyldiphenyl octylcyclopentadienyl cyanochromium; triphenylmethane chromium N,N,N',N'-tetramethyl-methylenediamine carbonyl; sec-butylbenzene trichlorochromium nitrosyl; ethylbenzene chromium triammonia; hexamethylbenzene cyclopentadienyl phenylmolybdenum; benzene pentachloro cyanomolybdenum; toluene molybdenum tris-dodecylamine; benzene tungsten tris-phenyl isonitrile; o-xylene tungsten tris-tri-iodophosphine, and the like.

*Example II*

Methylcyclopentadienyl bromochromium tricarbonyl (300 parts), 850 parts of toluene and 180 parts of ferric chloride are heated to reflux over a period of six hours with constant agitation. During this heating an amount of gas is given off corresponding to the total amount of carbon monoxide in the carbon compound. After the reaction vessel is cooled the contents are hydrolyzed with 80 parts of weakly acidified water and the organic layer is separated. Toluene methylcyclopentadienyl bromochromium is separated in good yield from the organic layer. The methylcyclopentadienyl bromochromium tricarbonyl employed in this example is prepared by first treating chromium carbonyl with methylcyclopentadienyl sodium and then adding HgCl₂. The resulting salt is bromonated to give the methylcyclopentadienyl bromochromium tricarbonyl.

Further examples of Group VI-B aromatic coordination compounds of this invention include n-octylbenzene chromium ethylenediamine carbonyl; n-butyl-benzene molybdenum tricarbonyl; sec-butylbenzene tungsten triammonia; benzene molybdenum carbonyl trimethylenediamine; toluene pentamethyl chlorotungsten; mesitylene pentacyano hydromolybdenum; benzene indenyl cyanotungsten; mesitylene tungsten tri-2,5-diaminohexane; α-methylbutylbenzene dichlorochromium bis-triphenylphosphine; mesitylene chromium bis-butyl dibromophosphine; toluene chlorochromium nitrosyl; mesitylene dicyano dimethylchromium; benzene tetramethyl chloromolybdenum; p-xylene tetracyanotungsten carbonyl, etc.

*Example III*

Cyclopentadienyl chloromolybdenum tricarbonyl is reacted with p-xylene in the presence of aluminum chloride to produce p-xylene cyclopentadienyl chloromolybdenum. The starting material is prepared in a manner similar to that described in Example II for methylcyclopentadienyl bromochromium tricarbonyl.

Still other examples of Group VI-B compounds of this invention include benzene cyclopentadienyl chlorochromium, mesitylene methylcyclopentadienyl cyanochromium; o-xylene ethylcyclopentadienyl hydrochromium; n-butylbenzene tri-n-hexyl chromium nitrosyl; cumene chromium dinitrosyl, isopropylbenzene chromium tris-dipropylamine; toluene tetramethylchromium tert-phenylamine; m-xylene pentacyano ethylchromium; prehnitene diiodochromium propylenediamine; durene cyclopentadienyl chromium; benzene chromium carbonyl nitrosyl; toluene cyclopentadienyl chromium; mesitylene methylcyclopentadienyl chromium; o-xylene ethylcyclopentadienyl chromium; ethylbenzene n-octylcyclopentadienyl molybdenum; diphenyl diethylcyclopentadienyl molybdenum; n-butylbenzene indenyl tungsten; cumene chromium nitrosyl carbonyl; amylbenzene molybdenum nitrosyl ammonia; m-diphenylbenzene n-amyl chromium dicarbonyl; 1,2,3-triethylbenzene ethylcyclopentadienyl chromium; isopropylbenzene cyanochromium bis-diisopropylamine and the like.

Example IV

Working in a nitrogen atmosphere, 120 parts of titanium dichloride, 290 parts of aluminum tribromide and 1000 parts of ethylbenzene are refluxed for four hours. While the nitrogen atomsphere is maintained the reaction mixture is hydrolyzed with water and the organic layer containing di(ethylbenzene) titanium is then transferred while under nitrogen to a pressure resistant vessel. The vessel is sealed and pressured with carbon monoxide to a pressure of about 500 p.s.i.g. and the temperature is elevated to about 165° C. These conditions are maintained for about three hours after which time the pressure is vented, the vessel is discharged and the contents subjected to fractional distillation at reduced pressure. Ethylbenzene titanium tetracarbonyl having the formula $C_2H_5C_6H_5Ti(CO)_4$ results.

Representative Group IV–B compounds of this invention include p-diphenylbenzene diisobutyl zirconium tricarbonyl; 1,3,5-triethylbenzene dibromo hafnium tri-tert-butylamine; 1-n-hexyl-3-isopropylbenzene dicyanotitanium tris-sec-dodecylamine; benzene difluorozirconium tris-tert-phenylamine; p-cymene pentamethyl tri-heptyl titanium; benzene tetracyano tetramethyl titanium; toluene pentaethyl zirconium nitrosyl; hexamethylbenzene dinonyltitanium tricarbonyl; durene amylcyclopentadienyl tri-amyltitanium; benzene methylcyclopentadienyl dichloro titanium; diphenyl titanium tris-tert-phenylamine; allylbenzene titanium tris-triiodophosphine; n-amylbenzene ethyl titanium dinitrosyl; toluene chlorotitanium tricarbonyl; benzene butylzirconium triammonia; benzene zirconium tricarbonyl; toluene hafnium dinitrosyl; benzene trimethyl hafnium nitrosyl and the like.

Example V

Dicyclopentadienyl titanium dichloride is refluxed with mesitylene in the presence of aluminum chloride. The reaction mixture is maintained at reflux for up to 24 hours after which time mesitylene cyclopentadienyl dichlorotitanium is recovered.

Other Group IV–B metal compounds of this invention include benzene cyclopentadienyl titanium nitrosyl; toluene methylcyclopentadienyl trichlorotitanium; o-xylene ethylcyclopentadienyl tricyanotitanium; ethylbenzene n-octylcyclopentadienyl trihydrotitanium; diphenyl dimethylcyclopentadienyl trimethyltitanium; n-butylbenzene indenyl tri-n-hexyltitanium; cumene titanium dinitrosyl carbonyl; isopropylbenzene titanium dinitrosyl ammonia; diphenylmethane titanium tricarbonyl tert-phenylamine; p-xylene titanium dinitrosyl N-methyl-N-phenylamine; toluene titanium triammonia; mesitylene ethylcyclopentadienyl cyanotitanium; mesitylene zirconium triammonia; isodurene pentachloro cyanohafnium; pentamethylbenzene indenyl dibromotitanium; benzene titanium nitrosyl bis-methylisonitrile; prehnitene tricyano zirconium bis-sec-butylamine; durene amylcyclopentadienyl hafnium methyl-dichlorophosphine etc.

Example VI

The procedure of Example IV is repeated using zirconium iodide as the metal reactant, and boron trifluoride as the Friedel-Crafts catalyst. In this example para-xylene is employed as the aromatic compound. Para-xylene zirconium tetracarbonyl results.

Still other aromatic Group IV–B metal coordination compounds of this invention include allylbenzene titanium dinitrosyl trichlorophosphine; n-amylbenzene titanium dinitrosyl ethylene-diamine; tert-butylbenzene titanium tetracarbonyl; sec-butylbenzene titanium tricarbonyl ammonia; benzene zirconium dicarbonyl trimethylenediamine; toluene pentaethyl hafnium nitrosyl; mesitylene tri-methyl pentacyano hafnium; 1,3-di-n-propylbenzene indenyl tricyano titanium; p-phenyl toluene methylcyclopentadienyl trihydrozirconium; mesitylene hafnium tetra-3,5-diaminoheptane; α-methylbutylbenzene dichlorotitanium, and the like.

Example VII

To a solution of one mole of soduim cyclopentadienide (prepared from cyclopentadiene and sodium in tetrahydrofuran) was added dropwise under cooling 0.25 mole vanadium tetrachloride. The solution was blanketed with nitrogen. The reaction is very violent, due in part to the complexing of the vanadium tetrachloride with THF. A dark reddish-purple solution resulted. This solution was charged to an autoclave and treated with carbon monoxide at a temperature of 175° C. and a pressure of 3000 p.s.i. CO for one hour. After cooling the reaction mixture was discharged, the solvent evaporated under nitrogen, and the cylopentadienyl vanadium tetracarbonyl product was sublimed in high vacuum at 70–80° C. The sublimate was obtained as golden orange crystals, volatile and hydrocarbon soluble, M.P. 138° C. Analysis of the product indicated that it contained 22.3 percent vanadium which corresponds very well with the calculated analysis for $C_9H_5O_4V$ of 22.34 percent vanadium. This cyclopentadienyl vanadium tetracarbonyl (1.0 mole) is treated with 1.1 mole (a slight excess) of aluminum tribromide in the presence of a tenfold excess of toluene. The mixture is refluxed for about 2 hours, and after hydrolysis and fractional distillation of the resulting organic layer, toluene cyclopentadienyl vanadium carbonyl is isolated and purified by recrystallization at reduced temperatures.

Examples of other Group V–B compounds of this invention include benzene methylcyclopentadienyl vanadium carbonyl; toluene cyclopentadienyl dicyanovanadium; p-xylene butylcyclopentadienyl vanadium; ethylbenzene pentahydro vanadium ammonia; mesitylene di-methylcyclopentadienyl dibromovanadium; cumene methylvanadium dinitrosyl; benzene ethylvanadium tricarbonyl; isopropylbenzene iodo-vanadium dinitrosyl; allylbenzene vanadium nitrosyl dicarbonyl; n-amylbenzene vanadium nitrosyl ethylenediamine; sec-butylbenzene chloro niobium tricarbonyl; 2,3-dimethylbenzene indenyl vanadium carbonyl; p-indenyltoluene methylcyclopentadienyl vanadium butylisonitrile; mesitylene vanadium 3,5-diaminodecane nitrosyl; 2-phenylpentane chlorovanadium dinitrosyl; p-diphenylbenzene isobutyl vanadium tricarbonyl; 1,3,5-triethylbenzene iodovanadium triammonia; 1-butyl-3-isopropylbenzene cyanovanadium tris-sec-dodecylamine; α-ethylallylbenzene trihydrovanadium diphenylenediamine; benzene chlorovanadium tris-tert-phenylamine; p-cymene ethylcyclopentadienyl niobium ammonia; toluene niobium methylenediamine nitrosyl; and hexamethylbenzene dodecyltantalum tricarbonyl.

Example VIII

Dibenzene vanadium, prepared by the reaction of benzene with vanadium chloride in the presence of aluminum and aluminum chloride, followed by reduction of the resulting dibenzene vanadium cation, is treated under pressure with NO. NO pressure from 10 to 1000 p.s.i.g. is employed and the reaction temperature is varied from 0 to 150° C. to produce an optimum yield of benzene vanadium dinitrosyl having the formula $C_6H_6V(NO)_2$.

Example IX

Ten parts of chromium carbonyl, 20 parts of benzene, 20 parts of 5-trichloromethylcyclopentadiene and 70 parts of diethyleneglycol dimethylether are charged to an evacuated reaction vessel. The reaction mixture is then heated at reflux (with stirring under nitrogen) for 10 hours. The vessel is then cooled, the contents are discharged and filtered. The solvent is removed from the filtrate by heating in vacuo to give a good yield of benzene chromium trichloromethylcyclopentadiene.

Example X

Five parts of dicyclopentadienyl titanium dicarbonyl, 50 parts of mesitylene and 50 parts of methylcyclopentadiene are charged to an evacuated autoclave equipped with inlet and discharge ports, stirring means, pressure control means and temperature control means. The autoclave is pressurized with nitrogen to 800 p.s.i.g. and the autoclave is heated to 100° C. The temperature is maintained at 100° C. for 5 hours during which time the reaction mixture is stirring continuously. The autoclave is then cooled, the nitrogen is vented off and the contents are discharged. The solvent is removed by heating the reaction product in vacuo. The residues are then distilled to give a good yield of mesitylene titanium cyclopentadiene dicarbonyl.

*Example XI*

Three parts of dibenzene vanadium, 20 parts of cyclopentadiene and 20 parts of hexane are charged to an evacuated autoclave equipped as in the previous example. The autoclave is pressurized with carbon monoxide to 500 p.s.i.g., and heated to 150° C. This temperature is maintained for 6 hours during which time the reaction mixture is continuously agitated. The autoclave is then cooled, carbon monoxide gas is vented off and the contents are discharged. The solvent is removed by heating the reaction product in vacuo. The residues are distilled to give a good yield of benzene vanadium cyclopentadiene carbonyl.

Other compounds of this invention include benzene chlorovanadium dicarbonyl; toluene dicyanovanadium nitrosyl; mesitylene pentacyanovanadium; hexylbenzene tricyano vanadium nitrosyl; benzene trifluorovanadium nitrosyl; benzene trifluorovanadium bis-sec-phenylamine; toluene pentamethyl tantalum; toluene pentabromo chromium; hexamethylbenzene pentacyano tungsten; m-dipropylbenzene indenyl vanadium; toluene methylcyclopentadienyl vanadium; mesitylene bromoniobium 3,5-diaminohexane; 2-phenylpentane dichloro tantalum nitrosyl; benzene vanadium nitrosyl phenylamine; p-xylene vanadium nitrosyl methylethylamine; allylbenzene niobium nitrosyl trichlorophosphine; n-amylbenzene chloroniobium methylene diamine; benzene cyanotantalum dicarbonyl; and tert-butylbenzene trihydro tantalum ammonia.

*Example XII*

The procedure of Example VII is repeated employing a tantalum halide in lieu of the vanadium chloride. After carbonylation to cyclopentadienyl tantalum tetracarbonyl, benezene cyclopentadienyl tantalum carbonyl is produced by reaction with benzene in the presence of a slight excess of aluminum chloride.

Still other examples of the novel Group V–B metal compounds of this invention include toluene methylethylcyclopentadienyl hydrovanadium; p-xylene ethylcyclopenadienyl ethylniobium; ethylbenzene tetrabutyl tantalum ammonia; diphenyl vanadium tricarbonyl; benzene indenyl cyanovanadium; benzene vanadium dinitrosyl; benzene vanadium tricarbonyl; ethylbenzene tricyanovanadium nitrosyl; mesitylene dibromoniobium bis-butyldibromophosphine; toluene cyclopentadienyl chlorotantalum; benzene niobium dicarbonyl nitrosyl; toluene pentaethyl niobium carbonyl; mesitylene dihexyl pentacyano tantalum; propylbenzene indenyl dichloro tantalum; toluene methylcyclopentadienyl dihydro tantalum, and the like.

The novel aromatic metal compounds of this invention can be employed as polymerization catalysts in the polymerization of olefins; as drying agents in drying oil compositions and as metal sources in gas-phase plating operations. The Group IV–B metals and particularly titanium compounds of this invention are preferred as polymerization catalysts. They are often employed together with aluminum and aluminum halides in the pressure polymerization of such unsaturated compounds as ethylene. For use as dryers the zirconium and chromium compounds of this invention are preferred, whereas in gas plating operations the tantalum, chromium and tungsten compounds find the greatest utility as they produce higher acid resistance coatings on the surface to which bonded. In addition the compounds of this invention are useful as intermediates in the preparation of other organometallics, drugs, insecticides, etc.

The following is given to illustrate the use of compounds of this invention as polymerization catalysts; the parts are given by weight. A sealed autoclave provided with a stirrer is charged in the absence of moisture or air with 250 parts of hexane, 20 parts of active aluminum, 2 parts of aluminum chloride and 12 parts of toluene titanium tetracarbonyl. The aluminum is prepared by cutting particles from a rod of aluminum, using a rotating cutter blade. The cutting was accomplished below the surface of hexane solvent so as to prevent contact of the freshly cut aluminum surfaces with air. The aluminum cuttings are removed from the solvent and added to the autoclave. It is not necessary to add any aromatic compound to initiate polymerization. The autoclave is closed and pressurized with 20 parts of ethylene giving an initial (not equilibrium) pressure of about 20 p.s.i.g. The temperature of the autoclave is thereafter increased to 90° C. and maintained at this temperature for 3 hours. The autoclave is then cooled to 25° C. and additional ethylene is charged to provide an equilibrium pressure of 600 p.s.i.g. Thereafter, the temperature of the autoclave is again raised to 90° C. The pressure in the autoclave increases upon heating to about 700 p.s.i.g. and heating is continued. The temperature then increases due to reaction and the pressure drops. Heating is then discontinued. The autoclave is then allowed to stand for about 16 hours.

This crude product is comminuted by vigorous agitation in the presence of an equal weight solution of methanol and 6 moles hydrochloric acid, using one part of polymer per 20 parts of solution. The procedure is repeated a total of 3 times. The solids (having the inorganic impurities removed) are then separated by filtration from the alcoholic solution, rinsed with acetone, and dried in a vacuum oven at 65° C. The so-purified solid polymer had a melting point above 120° C. which is determined using a standard polarizing microscope having a heating stage.

The aromatic metal coordination compounds of this invention may be incorporated in paints, varnish, printing inks, synthetic resins of the drying oil type, oil enamels and the like, to impart excellent drying characteristics to such compositions. Generally speaking from 0.01 to 0.05 percent of metal as a compound of this invention is beneficially employed as a dryer in such a composition. Good results are also obtained when the compounds of this invention are used in conjunction with lead naphthanate or cobalt naphthanate and similar drying agents.

For example, to a typical varnish composition containing 100 parts of ester gum, 173 parts of tung oil, 23 parts of linseed oil and 275 parts of white petroleum naphtha is added 3.5 parts of benzene zirconium tetracarbonyl and 2.0 parts of lead naphthanate. The resulting varnish composition is found to have excellent drying characteristics. Good results are also obtained when other drying oil compositions and other compounds of this invention are employed.

Other compounds of this invention which may be employed as drying agents, catalysts and metal sources include benzene cyclopentadienyl chromium; toluene methylcyclopentadienyl molybdenum; o-xylene ethylcyclopentadienyl chromium; ethylbenzene n-octylcyclopentadienyl niobium; diphenyl dimethylcyclopentadienyl vanadium; n-butylbenzene indenyl vanadium; cumene tungsten nitrosyl carbonyl; isobutylbenzene molybdenum nitrosyl diammonia; diphenylmethanol chromium nitrosyl tert-phenylamine; p-xylene chromium nitrosyl N-methyl-N-amylamine; allylbenzene vanadium nitrosyl tribromophosphine; isoamylbenzene cyano tantalum ethylenediamine; n-butylbenzene ethyl molybdenum dicarbonyl; sec-butylbenzene trichloro chromium carbonyl; benzene methyl vanadium dicarbonyl; toluene diethyl niobium nitrosyl; mesitylene trimethyl dicyano tungsten; benzene zirconium cyclooctatetraene; toluene cyclopentatrienyl vanadium; benzene molybdenum tris-trichloroamine; benzene tetrahydromolybdenum phenylamine; benzene hexachlorotungsten; o-xylene tetranonylvanadium ethylphosphine; p-cymene amylcyclopentadienyl tungsten; toluene tricyanotantalum nitrosyl; pentamethylbenzene ethylindenyl tungsten; benzene vanadium nitrosyl bis-methyl isonitrile, and the like.

Having fully described the novel compounds of the present invention, modes for their preparation and methods for their employment, we do not intend that our invention be limited except within the spirit and scope of the appended claims.

We claim:

1. A nonionic complex aromatic metal compound of a metal selected from the class consisting of Groups IV–B, V–B and VI–B metals having a single aromatic molecule bonded to the metal through the carbon atoms of the benzene ring by donation of 6 electrons from said ring to said metal, which compound is stabilized by additional covalent bonding to dissimilar non-aromatic electron donating groups, such that the total number of electrons donated by said aromatic molecule and said dissimilar electron donating groups plus the atomic number of said metal equals an integer having a value of from 2 less than the atomic number of the next higher rare gas to the value of the next higher rare gas.

2. A nonionic complex aromatic metal compound having the formula

AMQ wherein M represents an atom of a metal selected from the class consisting of Groups IV–B, V–B and VI–B metals, A represents an aromatic compound having a benzene molecule coordinated to said metal atom through the carbon atoms of the benzene ring by donation of 6 electrons from said ring to said metal, and Q represents a discrete combination of non-aromatic electron donor groups involved in bonding with said metal atom, such that the total number of electrons associated with said metal atom equals an integer having a value of from 2 less than the atomic number of the next higher rare gas to the value of the next higher rare gas.

3. An nonionic complex aromatic metal compound having the formula

AM(B)$_b$(C)$_c$ wherein M represents a metal atom selected from the class consisting of Groups IV–B, V–B and VI–B metals, A represents an aromatic compound having a benzene nucleus coordinated to said metal atom through the carbon atoms of the benzene ring by donation of 6 electrons from said ring to said metal, and B and C represent electron donating groups which donate from 1 to 8 electrons each to the metal atom, $b$ is an integer ranging from 1 to 8, and $c$ is an integer ranging from 0 to 4, such that the atomic number of the metal M, plus $b$ times the number of electrons donated by B, plus $c$ times the number of electrons donated by C plus the 6 electrons donated by the aromatic molecule A equals an integer having a value of from 2 less than the atomic number of the next higher rare gas to the value of the next higher rare gas.

4. The compound of claim 1 wherein said metal achieves the electron configuration of the next higher rare gas.

5. The compound of claim 1 wherein said metal is a Group VI–B metal.

6. Mesitylene chromium tricarbonyl.

7. The compound of claim 1 wherein the metal atom is bonded to a single aromatic molecule and in addition is bonded to a cyclic polyolefin which contributes 4 electrons to the metal atom for bonding.

8. The compound of claim 7 wherein the cyclic polyolefin is a cyclopentadiene molecule.

9. The compound of claim 8 wherein the said metal achieves the electron configuration of the next higher rare gas.

10. The compound of claim 1 wherein the metal is bonded to a single aromatic molecule and in addition is bonded to a carbonyl group which donates two electrons to the metal atom for bonding.

11. The compound of claim 1 wherein the metal is bonded to a single aromatic molecule and in addition is bonded to a cyclopentadienyl hydrocarbon radical having 5 to about 13 carbon atoms which donates 5 electrons to the metal atom for bonding.

12. The compound of claim 1 wherein the metal is bonded to a single aromatic molecule and in addition is bonded to a cycloheptatrienyl hydrocarbon radical having 7 to about 15 carbon atoms which donates seven electrons to the metal atom for bonding.

13. As compositions of matter the stable organometallic carbonyls having the formula:

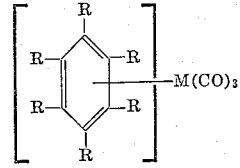

wherein M is selected from the group consisting of chromium, molybdenum and tungsten, M is bonded to the organic group through six electrons of the benzeniod ring system, said organic group contains not more than about 18 carbon atoms, and each R group is selected from the class consisting of hydrogen, alkyl and aryl.

14. The compound of claim 5 wherein said metal is chromium.

15. The compound of claim 5 wherein said metal is molybdenum.

16. The compound of claim 5 wherein said metal is tungsten.

17. A stable organochromium carbonyl having the formula:

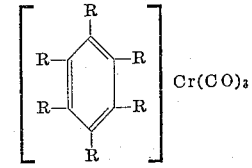

wherein the chromium is bonded to the organic group through six electrons of the benzeniod ring system, said organic group contains not more than about 18 carbon atoms, each R represents a member selected from the class consisting of hydrogen, alkyl and aryl, and at least one of said R's is selected from the class consisting of alkyl and aryl.

18. Tetrahydronaphthalene chromium tricarbonyl.

References Cited

UNITED STATES PATENTS 2,409,167   10/1946   Veltman _____ 260—429
2,818,416   12/1957   Brown et al. _____ 260—429

OTHER REFERENCES

Z. Anorg. Chem. 221, pp. 337–348 (1935).
Piper et al., J. Inorg. Nucl. Chem., vol. 3, pp. 104–124, September 1956.
Chem. Abstracts, vol. 50, No. 10, 12036, Sept. 10, 1956.
Angew. Chem., 68, p. 462 (1956).
JACS, 79, 5826 (1957).
Chemistry and Industry, Mar. 3, 1956, pp. 153–154.
Fischer et al., Chem. Berichte, 89, pp. 1809–1815 (1956).
Fischer et al., Chem. Berichte, 90, pp. 1725–1730 (1957).
Fischer et al., "Angew. Chem." 1957, 69, 715.
Nicholls et al, "Proceedings of The Chemical Society" (London), p. 152, May 1958.

TOBIAS E. LEVOW, *Primary Examiner.*

ABRAHAM H. WINKELSTEIN, *Examiner.*

R. S. AULL, W. J. VANBALEN, H. M. S. SNEED,
*Assistant Examiners.*